(12) United States Patent
Lee et al.

(10) Patent No.: US 9,121,450 B2
(45) Date of Patent: Sep. 1, 2015

(54) CAGE FOR ROLLING BEARING

(71) Applicant: KOREA INSTITUTE OF SCIENCE AND TECHNOLOGY, Seoul (KR)

(72) Inventors: Yong Bok Lee, Seoul (KR); Chang Ho Kim, Seoul (KR); Bok Seong Choe, Gunpo-si (KR); Sol Ji Ryu, Ansan-si (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/309,350

(22) Filed: Jun. 19, 2014

(65) Prior Publication Data

US 2014/0376850 A1 Dec. 25, 2014

(30) Foreign Application Priority Data

Jun. 24, 2013 (KR) .................. 10-2013-0072422
Nov. 27, 2013 (KR) .................. 10-2013-0145014

(51) Int. Cl.
*F16C 33/38* (2006.01)
*F16C 33/46* (2006.01)

(52) U.S. Cl.
CPC ......... *F16C 33/3862* (2013.01); *F16C 33/3887* (2013.01); *F16C 33/4641* (2013.01)

(58) Field of Classification Search
CPC ............... F16C 33/467; F16C 33/3862; F16C 33/3887; F16C 33/4641; F16C 19/02
USPC ......... 384/470, 523, 526, 530, 529, 538, 522, 384/577–578, 621, 623, 579; 29/898.067
See application file for complete search history.

(56) References Cited

U.S. PATENT DOCUMENTS

| | | | | |
|---|---|---|---|---|
| 2,018,701 A | * | 10/1935 | Bott | 384/527 |
| 2,861,849 A | * | 11/1958 | Case | 384/530 |
| 3,471,208 A | * | 10/1969 | Vannest | 384/530 |
| 3,586,405 A | * | 6/1971 | Claesson | 384/526 |
| 3,649,093 A | * | 3/1972 | Muratore et al. | 384/905 |
| 3,712,692 A | * | 1/1973 | Restelli | 384/579 |
| 3,944,307 A | * | 3/1976 | Bingle | 384/576 |
| 4,451,098 A | * | 5/1984 | Farley et al. | 384/526 |
| 4,568,206 A | * | 2/1986 | Imazaike | 384/530 |
| 4,626,113 A | * | 12/1986 | Forknall et al. | 384/530 |
| 4,902,145 A | * | 2/1990 | Johnson | 384/530 |
| 5,131,762 A | * | 7/1992 | Waskiewicz | 384/448 |
| 5,388,918 A | * | 2/1995 | Williams | 384/530 |

(Continued)

FOREIGN PATENT DOCUMENTS

| | | |
|---|---|---|
| JP | 3945673 B2 | 4/2007 |
| JP | 2008-64221 A | 3/2008 |

(Continued)

*Primary Examiner* — Marcus Charles
(74) *Attorney, Agent, or Firm* — NSIP Law

(57) ABSTRACT

A cage for a rolling bearing is coupled to a rolling bearing including an inner ring, an outer ring and a plurality of rolling elements rolling between the inner ring and the outer ring to keep intervals of the plurality of rolling elements, wherein the plurality of rolling elements include bodies coupled along a circumference thereof at predetermined intervals, wherein each of the bodies includes a first piece and a second piece which are attachable to each other and detachable from each other. A first coupler and a second coupler configured to be capable of being coupled to each other are respectively formed at the first piece and the second piece, and the first piece and the second piece are primarily coupled by means of a coupling force of the first coupler and the second coupler.

5 Claims, 4 Drawing Sheets

(56) References Cited

U.S. PATENT DOCUMENTS

| | | | | |
|---|---|---|---|---|
| 7,507,028 | B2* | 3/2009 | Markle | 384/470 |
| 2007/0230849 | A1* | 10/2007 | Naito | 384/530 |
| 2012/0163747 | A1 | 6/2012 | Leibowitz | |

FOREIGN PATENT DOCUMENTS

| | | |
|---|---|---|
| KR | 10-0838626 B1 | 6/2008 |
| KR | 10-2011-0088639 A | 8/2011 |
| KR | 10-1239751 B1 | 3/2013 |

* cited by examiner

CAGE FOR ROLLING BEARING

CROSS-REFERENCE TO RELATED APPLICATION

This application claims priority to Korean Patent Applications No. 10-2013-0072422, filed on Jun. 24, 2013 and No. 10-2013-0145014, filed on Nov. 27, 2013, and all the benefits accruing therefrom under 35 U.S.C. §119, the contents of which in its entirety are herein incorporated by reference.

BACKGROUND

1. Field

The present disclosure relates to a cage for a rolling bearing, and more particularly, to a cage for fixedly supporting a rolling element of a rolling bearing such as a ball or a roller.

[Description about National Research and Development Support]

This study was supported by the Development of Core Space Technology Project of Ministry of Education and Science Technology, Republic of Korea (Project No. 1345168960) under the superintendence of National Research Foundation of Korea.

2. Description of the Related Art

A bearing is a mechanical element for fixing a shaft of a rolling machine to a certain position and protecting the rotation of the shaft while supporting the weight of the shaft and a load applied to the shaft. Such an industrial bearing is used as an important part in machines for every instruments or equipment employed in manufacturing and producing lines in overall industries. In order to ensure dynamic stability and reduce shaking or vibration, the bearing should have durability and stability, and for this, many techniques are being studied and developed to improve the durability and stability of a bearing.

A bearing is generally applied to a vehicle industry and may also be applied to various machines or heavy equipment which needs rapid rotation. A bearing may be applied to a heavy equipment system such as an excavator for construction, a plane, a turbo pump for a rocket engine, a cryogenic cooler, an LNG pump or the like.

A rolling bearing includes a rolling element put between an outer ring and an inner ring thereof so that the rolling element may roll in contact with the outer and inner rings to reduce friction.

Generally, a rolling bearing is used together with a cage which maintains intervals of a plurality of rolling elements which roll between the inner ring and the outer ring, and also fixes the rolling element in a rollable state and thus rotates together with the rolling element to prevent the rolling element from deviating therefrom.

However, due to an unstable state of the cage, the bearing becomes unstable due to loads and vibrations in rotating, which may damage or brake the bearing frequently.

In order to solve this problem, when the cage is assembled, the cage is managed to minimize a fraction defective, which however is not appropriate for fundamentally improving the stability of the case.

SUMMARY

The present disclosure provides a cage whose body is divided into two pieces and designed to have a primary coupling force so that operation reliability and life of a bearing may be improved.

In one aspect, there is provided a cage for a rolling bearing, which is coupled to a rolling bearing including an inner ring, an outer ring and a plurality of rolling elements rolling between the inner ring and the outer ring to keep intervals of the plurality of rolling elements, wherein the plurality of rolling elements include bodies coupled along a circumference thereof at predetermined intervals, wherein each of the bodies includes a first piece and a second piece which are attachable to each other and detachable from each other, and wherein a first coupler and a second coupler configured to be capable of being coupled to each other are respectively formed at the first piece and the second piece, and the first piece and the second piece are primarily coupled by means of a coupling force of the first coupler and the second coupler.

According to an embodiment, the first piece may include a female coupler, the second piece may include a male coupler corresponding to the female coupler, and the first piece and the second piece may be engaged with each other.

The female coupler may be a coupling groove concavely formed at a bottom surface of the first piece, and the male coupler may be a coupling protrusion protruding on a top surface of the second piece to be coupled into the coupling groove.

In addition, a first coupling hole may be formed in the first piece to vertically pass through the first piece, a second coupling hole may be formed in the second piece to vertically pass through the second piece, the first coupling hole and the second coupling hole may be straightly communicated with each other when the first piece and the second piece are coupled, thereby forming a pin coupling hole through which a pin-type coupling member is capable of being coupled, and the first piece and the second piece may be secondarily coupled by a coupling force of the pin-type coupling member.

In addition, the coupling groove and the coupling protrusion may be formed to have greater diameters than the first coupling hole and the second coupling hole, the first coupling hole may be formed to pass through the coupling groove, and the second coupling hole may be formed to pass through the coupling protrusion.

In addition, the first piece and the second piece may respectively include a plurality of first rolling element accommodation grooves and second rolling element accommodation grooves to accommodate the plurality of rolling elements, the first coupler may be formed between the first rolling element accommodation grooves adjacent to each other, and the second coupler may be formed between the second rolling element accommodation grooves adjacent to each other.

DETAILED DESCRIPTION

Hereinafter, an embodiment of the present disclosure will be described with reference to the accompanying drawings. Even though the present disclosure is described based on the depicted embodiment, the embodiment is just for illustration, and the spirit, essential configuration and operations of the present disclosure are not limited thereto.

Figure 1:
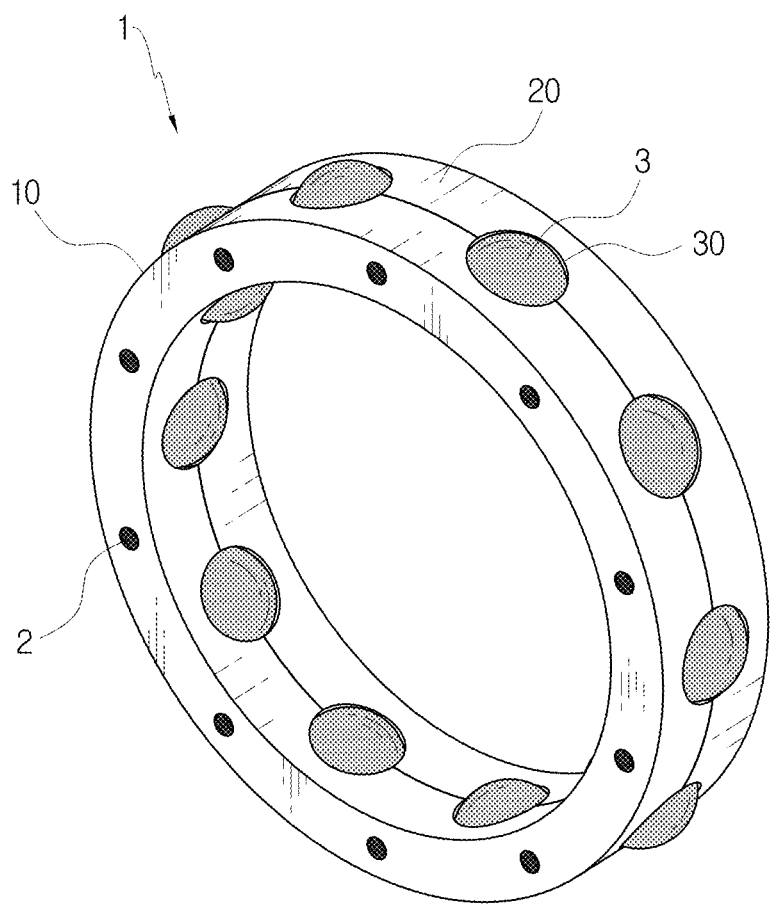
FIG. 1 is a perspective view showing a cage according to an embodiment of the present disclosure.

FIG. 1 is a perspective view showing a cage 1 according to an embodiment of the present disclosure.

The cage 1 of this embodiment is coupled to a rolling bearing including an inner ring (not shown), an outer ring (not shown) and a plurality of rolling elements 3 rolling between the inner ring and the outer ring.

The rolling bearing of this embodiment is a ball bearing which uses a ball as the rolling element 3.

The cage 1 allows the plurality of rolling elements 3 to keep predetermined intervals between the inner ring and the outer ring of the baring and also prevents the plurality of rolling elements 3 from deviating from the bearing.

As shown in FIG. 1, the cage 1 includes a first piece 10 and a second piece 20 which may be attached to each other and detached from each other, and the first piece 10 and the second piece 20 are coupled vertically to configure a single body.

It should be understood that the terms "upper", "lower", "top" and "bottom" used in the specification are to relatively express an arrangement of the cage 1, and they are not used to express absolute directions based on the ground. In FIG. 1, a left downward direction represents an upper direction, and a right upward direction represents a lower direction.

The first piece 10 and the second piece 20 of the cage 1 are coupled to each other to form rolling element pockets 30 formed along a circumference of a body of the cage 1 at regular intervals, and the rolling element 3 is accommodated in each rolling element pocket 30 in a rollable state.

As shown in FIG. 1, a part of the rolling element 3 accommodated in the rolling element pocket 30 protrudes out of the inner side and the outer side of the body to make a rolling contact with the inner ring and the outer ring of the bearing which are respectively connected to the inner side and the outer side of the body.

Figure 2:
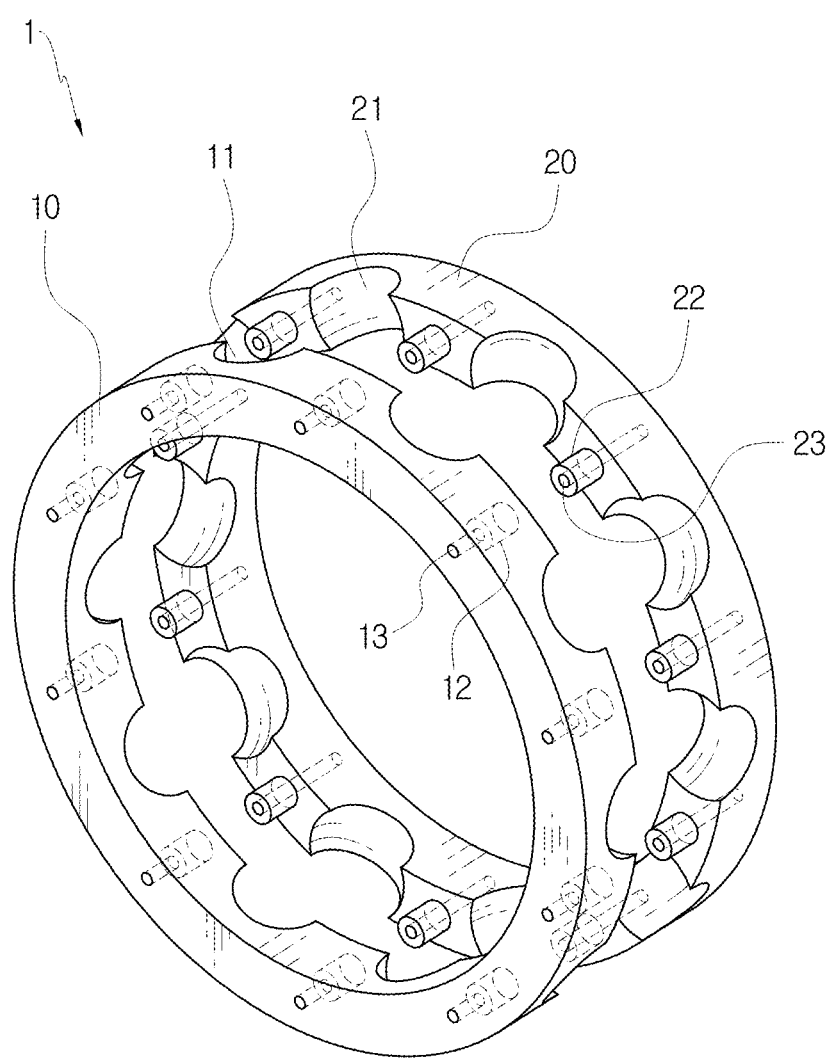
FIG. 2 is an exploded perspective view showing the cage of FIG. 1.
Figure 3:
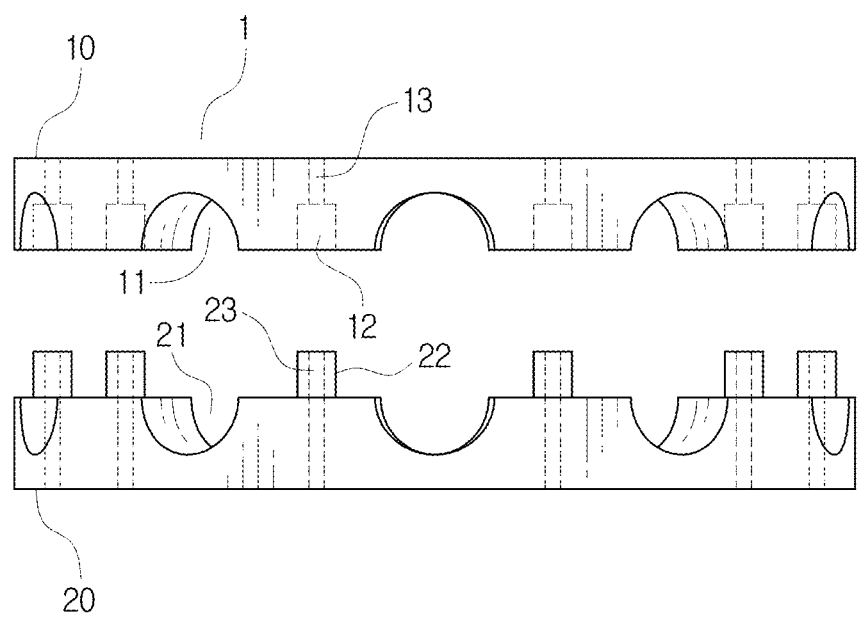
FIG. 3 is an exploded side view showing the cage of FIG. 1.

FIG. 2 is an exploded perspective view showing the cage 1 of this embodiment, and FIG. 3 is an exploded side view showing the cage 1 of this embodiment.

As shown in FIGS. 2 and 3, first rolling element accommodation grooves 11 having an approximately semicircular shape are formed in a bottom surface of the first piece 10 at regular intervals. Similarly, second rolling element accommodation grooves 21 having an approximately semicircular shape are formed in a top surface of the second piece 20 at locations corresponding to the first rolling element accommodation grooves 11.

If the first piece 10 and the second piece 20 are coupled, the first rolling element accommodation groove 11 and the second rolling element accommodation groove 21 form the rolling element pocket 30 in which the ball-type rolling element 3 may be accommodated, thereby accommodating and supporting the rolling element 3 (see FIG. 1).

A female coupler 12 is formed between the first rolling element accommodation grooves 11 of the first piece 10, and a male coupler 22 corresponding to the female coupler 12 is formed between the second rolling element accommodation grooves 21 of the second piece 20 so that the male coupler 22 may be coupled to the female coupler 12.

In this embodiment, the female coupler 12 is a coupling groove concavely formed in a bottom surface of the first piece 10, and the male coupler 22 is a coupling protrusion protruding on a top surface of the second piece 20 to be coupled with the coupling groove.

If the male coupler 22 is inserted into and coupled to the female coupler 12, the first piece 10 and the second piece 20 are engaged with each other, and the first piece 10 and the second piece 20 are primarily coupled by means of a coupling force caused by the engagement.

The coupling protrusion serving as the male coupler 22 may have a diameter slightly greater than that of the coupling groove serving as the female coupler 12, so that the coupling protrusion may be fit into the coupling groove.

Meanwhile, the first piece 10 and the second piece 20 of the cage 1 according to this embodiment may be secondarily coupled by a pin-type coupling member 2 such as a rivet, a rock bolt or the like in addition to the primary coupling of the male coupler 22 and the female coupler 12.

Referring to FIGS. 2 and 3, a first coupling hole 13 is formed in the first piece 10 to vertically pass through the first piece 10, and a second coupling hole 23 is formed in the second piece 20 to vertically pass through the second piece 20.

Figure 4:
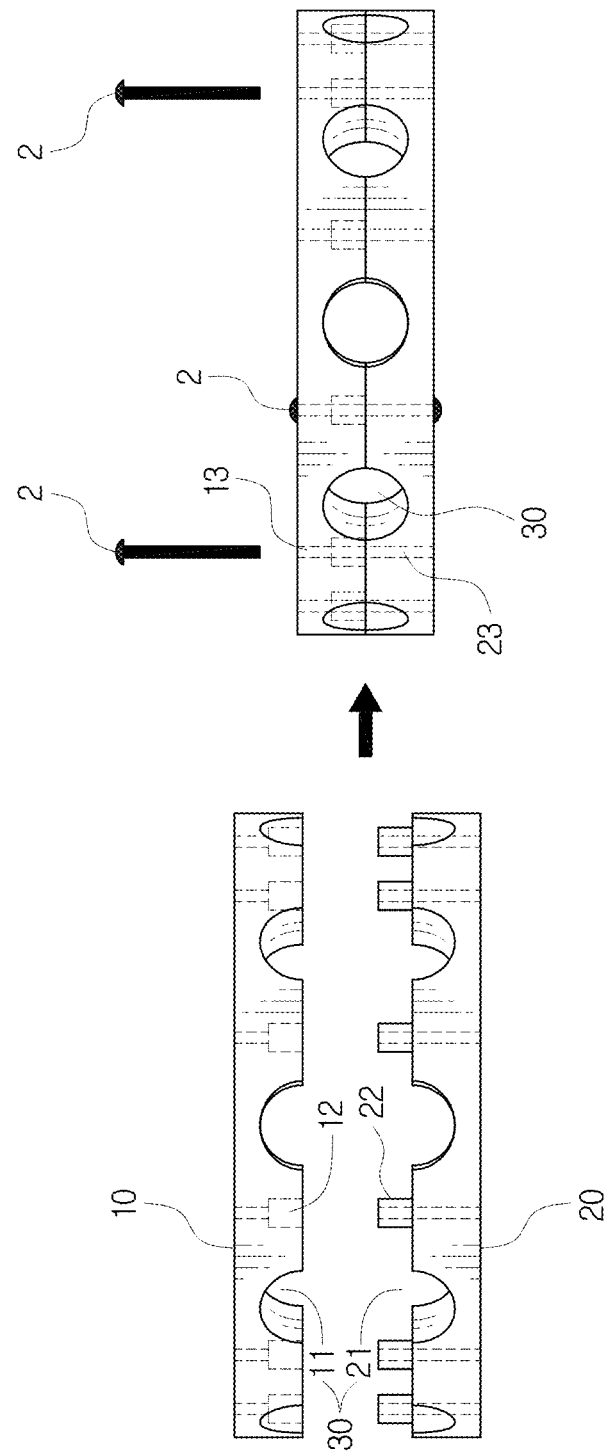
FIG. 4 is a diagram for illustrating a process of assembling the cage of FIG. 1.

When the first piece 10 and the second piece 20 are coupled, the first coupling hole 13 and the second coupling hole 23 are straightly communicated with each other to form a pin coupling hole, and the pin-type coupling member 2 may be coupled through the pin coupling hole (see FIG. 4).

The first coupling hole 13 and the second coupling hole 23 may be formed independently from the female coupler 12 and the male coupler 22, respectively. But in this embodiment, in order to enhance a coupling force of the cage, the first coupling hole 13 is formed to overlap with the female coupler 12, and the second coupling hole 23 is formed to overlap with the male coupler 22.

In detail, as shown in the figures, the female coupler 12 is formed to have a diameter greater than the first coupling hole 13, and the male coupler 22 is formed to have a greater diameter than the second coupling hole 23.

The first coupling hole 13 is formed to have a central axis identical to a central axis of the female coupler 12, and the first coupling hole 13 extends over the female coupler 12.

Similarly, the second coupling hole 23 is arranged to have a central axis identical to a central axis of the male coupler 22, and the second coupling hole 23 extends over the male coupler 22.

FIG. 4 is a diagram for illustrating a process of assembling the cage 1 of this embodiment.

The first piece 10 and the second piece 20 are located at upper and lower positions, and in a state where rolling elements (not shown) are located between the rolling element accommodation grooves 11, 21 formed at each piece, the first piece 10 and the second piece 20 are coupled.

At this time, the male coupler 22 and the female coupler 23 are coupled so that the first piece 10 and the second piece 20 are primarily coupled.

Next, as shown in the right portion of FIG. 4, the pin-type coupling member 2 is inserted into and fixed to the pin coupling hole through the first coupling hole 13 or the second coupling hole 23.

By means of a coupling force of the pin-type coupling member 2, the first piece 10 and the second piece 20 are secondarily coupled.

In the cage 1 of this embodiment, even though the pin-type coupling member is released or broken due to a load, vibration or the like while the bearing is in operation, the cage 1 may maintain its assembled state and strength due to the coupling force applied to both pieces, thereby improving reliability and durability of the bearing.

In addition, since the male coupler is fit into the female coupler and simultaneously the pin-type coupling member doubles the coupling force at the same position, a final coupling force between the first piece and the second piece is greatly improved.

What is claimed is:

1. A cage for coupling to a rolling bearing including an inner ring, an outer ring and a plurality of rolling elements rolling between the inner ring and the outer ring and for keeping predetermined intervals of the plurality of rolling elements, the cage comprising,
   a first piece and a second piece which are attachable to each other along a mutual circumference and detachable from each other, and when attached to each other, accommodate the plurality of rolling elements at predetermined intervals around the mutual circumference of the first piece and the second piece;
   wherein a first coupler and a second coupler configured to be capable of being coupled to each other are respectively formed at the first piece and the second piece, and the first piece and the second piece are primarily coupled by means of a coupling force of the first coupler and the second coupler, and
   wherein the second coupler is a cylindrical protrusion having a uniform diameter and the first coupler is a corresponding cylindrical concavity having a uniform diameter that is smaller than the uniform diameter of the second coupler.

2. The cage according to claim 1, comprising a plurality of cylindrical protrusions having a uniform diameter and a plurality of cylindrical concavities having a uniform diameter,
   wherein each cylindrical concavity is formed in the first piece,
   wherein each cylindrical protrusion is formed on the second piece, and
   wherein the first piece and the second piece are engaged with each other.

3. The cage according to claim 1,
   wherein a first coupling hole is formed in the first piece to vertically pass through the first piece,
   wherein a second coupling hole is formed in the second piece to vertically pass through the second piece,
   wherein the first coupling hole and the second coupling hole are straightly communicated with each other when the first piece and the second piece are coupled, thereby forming a pin coupling hole through which a pin-type coupling member is capable of being coupled, and
   wherein the first piece and the second piece are secondarily coupled by a coupling force of the pin-type coupling member.

4. The cage according to claim 3,
   wherein the cylindrical concavity and the cylindrical protrusion are formed to have greater diameters than the first coupling hole and the second coupling hole,
   wherein the first coupling hole is formed to pass through the cylindrical concavity, and
   wherein the second coupling hole is formed to pass through the cylindrical protrusion.

5. The cage according to claim 1,
   wherein the first piece and the second piece respectively includes a plurality of first rolling element accommodation grooves and second rolling element accommodation grooves to accommodate the plurality of rolling elements,
   wherein the first coupler is formed between the first rolling element accommodation grooves adjacent to each other, and
   wherein the second coupler is formed between the second rolling element accommodation grooves adjacent to each other.

* * * * *